United States Patent [19]
Owen

[11] Patent Number: 5,685,952
[45] Date of Patent: Nov. 11, 1997

[54] DEINKING OF PAPER USING MAGNETIC FORCES

[76] Inventor: David Malcolm Owen, Ashdown House, 34 Church St., Davenham, Northwich, Cheshire, England, CW9 8NF

[21] Appl. No.: 548,543

[22] Filed: Oct. 26, 1995

Related U.S. Application Data

[63] Continuation-in-part of Ser. No. 535,206, Oct. 19, 1995.

[30] Foreign Application Priority Data

Apr. 21, 1993 [GB] United Kingdom ................... 9308250

[51] Int. Cl.⁶ ............................. D21C 5/02; B03C 1/00
[52] U.S. Cl. ........................... 162/4; 209/8; 209/214; 209/215; 210/695
[58] Field of Search .......................... 162/4, 5; 209/8, 209/9, 214, 215, 223.1, 223.2, 224; 210/695

[56] References Cited

U.S. PATENT DOCUMENTS

| | | | |
|---|---|---|---|
| 2,074,085 | 3/1937 | Frantz | 209/224 |
| 3,471,011 | 10/1969 | Lannicelli et al. | 209/214 |
| 4,176,054 | 11/1979 | Kelley | 209/8 |
| 4,187,463 | 2/1980 | Kivenson | 324/228 |
| 5,217,573 | 6/1993 | Tsai et al. | 162/5 |
| 5,413,675 | 5/1995 | Ikonomou et al. | 162/5 |
| 5,458,736 | 10/1995 | Foster | 162/7 |
| 5,527,426 | 6/1996 | Marwah et al. | 162/5 |

FOREIGN PATENT DOCUMENTS

| | | |
|---|---|---|
| 0067687 | 12/1981 | European Pat. Off. . |
| 4124990 | 1/1993 | Germany . |
| 01056156 | 6/1989 | Japan . |
| 01184048 | 10/1989 | Japan . |
| 767125 | 1/1957 | United Kingdom . |
| 768451 | 2/1957 | United Kingdom . |
| 1482458 | 10/1974 | United Kingdom . |
| 9215648 | 9/1992 | WIPO . |

OTHER PUBLICATIONS

"Deinking of Laser-printed Stock Using Chemical Densification and Forward Cleaning", Olson, C.R., et al., Jan. 1993, Tappi Journal.
Copy of Search Report for Application GB 9407903.5.
Copy of Search Report for Potts, Kerr & Co. reference B0291.
"Magnetic Separation: A Review of Principles, Devices and Applications", by John E. Oberteuffer, IEEE Transactions on Magnetics, vol. MAG-10, No. 2, Jun. 1974.
"The effect of temperature and oleate adsorption on the growth of maghemite particles", by K.J. Davies, S. Wells and S.W. Charles, Journal of Magnetism and Magnetic Materials 122 (1993) 24–28, North-Holland.
"Separation processes in polydisperse magnetic fluids" by E. Blums and A. Yu. Chukhrov, Journal of Magnetism and Magnetic Materials 122 (1993) 110–114, North-Holland.
"Magnetic Filtration of Perrofluids", by O'Grady, K., Stewardson, H.R., Chantrell, R.W., Fletcher, D., Urwin, D., and Parker, M.R., IEEE Transactions on Magnetics, vol. MAG-22, No. 5, Sep. 1986.
"Improved high gradient magnetic separation for the positive selection of human blook mononuclear cells using ordered wire filters", Richards, A.J., Thomas, T.E., Roath, O.S., Watson, J.H.P., Smith, R.J. and Lansdorp, P.M., Journal of Magnetism and Magnetic Materials 122 (1993) 364–366, North-Holland.
"Biological and biomedical aspects of magnetic fluid technology", Roath, S., Journal of Magentism and Magnetic Materials 122 (1993) 329–334, North-Holland.
"Operation of a full–scale device of high gradient magnetic filter for treatment of gas scrubber water from vacuum degassing process in a steel mill", Takino, K., Tankaka, T., Sshichiri, T. (undated).
Magnetic and High–Tension Separation, Chapter 13 "Mineral Processing Technology" 3rd Edition, An Introduction to the Practical Aspects of Ore Treatment and Mineral Recovery, by Wills, B.A., Pergamon Press (undated).
"Industrial Mineral Processing 4—Magnetic separation" by Gerry Clark, Editor, Industrial Minerals, May, 1985.
Advertisement for Aqualine Corporation about HEMF High Extraction Magnetic Filtration.
*Kirk–Othmer Encyclopedia of Chemical Technology*, 3rd Edition, vol. 14 "Magnetic Separation", pp. 708–732, John Wiley & Sons, 1981.
"The New Medium–Intensity Drum Type Permanent Magnetic Separator Permos and its Practical Application for Processing of Industrial Minerals in Dry and Wet Mode", by Dr. Ing H.D. Wasmuth, Industrial Minerals Conference, Apr. 1995.

*Primary Examiner*—Donald E. Czaja
*Assistant Examiner*—Jose A. Fortuna
*Attorney, Agent, or Firm*—Sidley & Austin

[57] ABSTRACT

A method for removal of magnetic ink from pulp stock formed from xerographic and laser printed paper waste comprising feeding such pulped paper waste past one or more magnets for removal of all or substantially all of such magnetic ink. The magnetic ink can be removed by capture or deflection techniques. The preferred pulp slurry has a concentration of 4% or less by weight pulp. The preferred magnetic force to be applied utilizes background magnetic fields in excess of 2000 Gauss and a field gradient in excess of 500 Gauss/cm. Also, a method for improving the recyclability of paper waste having ink thereon which does not normally contain a magnetic component, by utilizing one or more magnetic carriers in the formulations of the printing ink utilized.

17 Claims, 2 Drawing Sheets

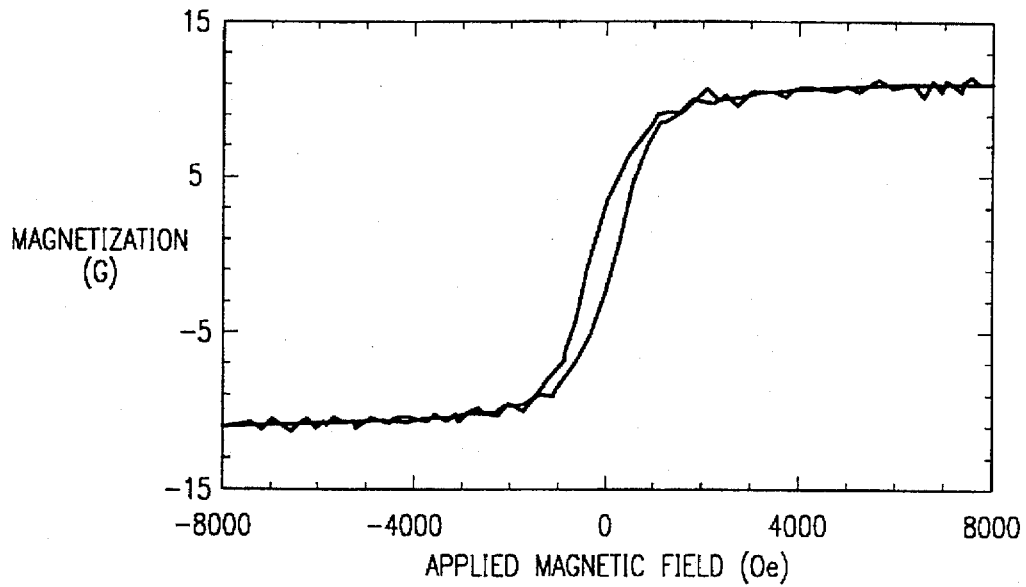

FIG. 3

TYPICAL SOLIDS COMPONENTS OF LX PRINTED PAPER

| | COMPONENT | VISUAL APPEARANCE | TYPICAL SIZE | PROPORTION OF TOTAL SOLIDS VOLUME |
|---|---|---|---|---|
| 1 | WOOD FIBERS IN RANDOM ORIENTATION OCCASIONAL KNOTS | | 50μm x 2-12mm LONG | 50-70% |
| 2 | WHITE MINERALS (ASH) USED AS FIBERS, COATINGS, EXTENDERS, ETC | | BLOCKY OR PLATY 0-30μm EQUIVALENT SPHERICAL DIAMETER | 10-20% |
| 3 | LIBERATED INK (SPECS) PARTICLES | | SPHERICAL OR PLATY TYPICALLY 25μm BUT RANGING FROM 1-50μm. ALSO FUSED AGGREGATES 25-500μm | 2-8% |
| 4 | COMPOSITES OF FIBERS AND ASH BONDED BY FUSED AGGLOMERATES OF INK PARTICLES | | VERY WIDE RANGE OF SIZES. ACTUAL SIZE NOT POSSIBLE TO QUANTIFY | 10-20% |
| 5 | FUSED COMPOSITES OF WHITE MINERALS (ASH) AND INK PARTICLES | | 25-500μm | 5-10% |

FIG. 4

DEINKING OF PAPER USING MAGNETIC FORCES

CROSS-REFERENCE TO RELATED APPLICATION

This application is a continuation in part of U.S. application Ser. No. 08/535,206 filed Oct. 19, 1995, which is a 371 of PCT/GB94/00842 Apr. 21, 1994.

TECHNICAL FIELD

The present invention relates to the recycling of paper. In particular, the invention relates to the removal of ink from paper so as to recover clean paper for reuse.

BACKGROUND OF THE INVENTION

The present invention concerns improvements in or relating to the deinking of paper. More particularly, the present invention is concerned with the recovery of paper for recycling purposes, which paper has approximately 80% or more of ink removed therefrom. More particularly, the invention is concerned with the recycling of high quality white paper utilised in the production of recycled photocopier and laser print paper.

In recent times, more and more attention is being given to the recycling of paper and paper products in an attempt to reduce the amount of virgin pulp which is utilised in paper production. In order to ensure that the recycled paper is of the desired quality, it is generally required to remove approximately 80% or more of the print from the paper and paper products to be recycled. This is particularly the case in connection with laser and xerographic printed papers. In the paper industry, such papers are normally of high quality white paper and are normally regarded as a potentially extremely valuable feedstock to make recycled copier and laser print paper. However, to date, the conventional method adopted for deinking such papers has not been particularly successful. Chemical extractant techniques, such as flotation and the use of dispersion aids have primarily been used in this regard.

There are two main issues surrounding the economic recyclability of such laser and xerographic printed papers. Firstly, when paper and paper products are collected for recycling, there is generally a mixture of all types of waste paper collected. Accordingly, in order to ensure that quality recycled copier and laser print paper are obtained, it is necessary to ensure that only laser and xerographic printed paper or paper products should be present. Secondly, it is necessary to ensure, as far as possible, the complete removal of ink from the pulped laser and xerographic printed papers in order to eliminate both the darkening effect produced by small particles of ink and the spot formation produced by larger pieces of ink.

In view of the fact that the above-identified chemical techniques have not proved economically successful, having regard to the fact that firstly the waste paper cannot be properly separated, coupled with the fact that when laser and xerographic printed papers are treated then substantially complete ink removal is not obtained, in order to obtain the required good quality fibre, virgin pulp is being used which means that more and more trees have to be felled with consequent ecological problems associated therewith.

As noted in U.S. Pat. No. 5,217,573 the conventional methods for ink removal are not satisfactory for laser and xerographic inks. The method of that patent has disadvantages as well.

It is an object of the present invention to provide a method for initially sorting high quality laser and xerographic printed paper waste from other paper waste and thereafter to remove ink therefrom in order to provide high brightness paper which is acceptable for quality writing or printing paper. Of course, it can also be used for producing paper products of lesser quality.

It is also a further object of the present invention to utilize the method of the present invention in the treatment of other types of printed paper products, wherein the ink utilized for printing has been appropriately treated.

The present invention is based on the discovery that the ink utilized in laser and xerographic printed papers is comprised of a thermoplastic resin (usually PVC) containing carbon black as pigment and usually ferric oxide to assist in handling the dry ink in the printing device. Based on such discovery, we have now found that it is possible to separate laser and xerographic printed papers from other type of papers by magnetic separation and furthermore, have discovered it is possible to separate ink from the fibre of such laser and xerographic printed papers after pulping, again by the use of a magnet.

The goal in removing ink from paper and particularly in relation to high grade office paper is to achieve Essentially Speck Free High Brightness (hereinatfer "ESFHB") paper. To achieve paper of this quality requires an ESFHB pulp. To obtain such pulp from recycled stock is difficult. The problem is very pronounced in paper which has been printed by laser printer ink or xerographic inks. These inks are much different in character than the magnetic material used on magnetic recording papers, or inks which are absorbed on the paper. Magnetic recording papers generally utilize ferrite or a ferrite-like material with similar magnetic properties. These materials are readily magnetized and will maintain a high remnant magnetization. This is not true of laser and xerographic inks.

Laser and xerographic inks are typically composed of thermoplastic resins and carbon black. The inks may also contain iron compounds that render them weakly magnetic for the purpose of mobilizing the dry ink powder in the printing device. Thus, the magnetic response of these inks is very small compared with the material used for magnetic recording papers because of the mass amounts of excess carbon black and thermoplastic resin mixed with the iron.

Additionally, the magnetic component of a laser and xerographic inks must have low remnance (sometimes called magnetically soft). This is in contrast to high remnance materials which remain magnetic after the material is subjected to a magnetic force, such as materials used for magnetic recording tape. In contrast, low remnant materials after the magnetizing field is removed, it will rapidly lose any induced magnetism when the force is removed. The low remnance characteristics of these inks is needed in the printing process otherwise the particles would magnetically bind into agglomerates which would clog the printing device, and if the ink formed with high remnant material it would lose the ability to be deposited on the paper as true particles. Thus, print definition would suffer. Furthermore, the ink particles cannot be strongly magnetic as this would make the ink difficult to eject from the magnetic transport system of the printer. To remove laser and xerographic ink from recycled paper in sufficient quantity to achieve ESFHB pulp for paper making has previously been quite difficult. To remove such print sufficiently to produce a paper with brightness acceptable for writing papers has not been possible before to the knowledge of the inventor.

Thus, there has been a continuing need to provide a process for the removal of laser and xerographic inks from paper such that a ESFHB pulp is prepared. The present invention has the advantage of producing a pulp from recycled paper which can be used to provide an ESFHB paper with good brightness. The present invention is also unique in that the magnetic forces can be adjusted and tuned to meet the characteristics of various inks, and all quality of requirements of the end pulp desired.

SUMMARY OF THE INVENTION

According to one aspect of the present invention there is provided a method of dry separating and/or sorting laser and xerographic printed paper waste containing ink with a magnetic component from other paper waste products containing ink but which does not contain any magnetic material, by the use of at least one magnet and by applying an appropriate magnetic force. Dry paper may shredded dry into strips by a shredding machine. The paper strips are placed on a vibrating belt to separate the strips and passed under a very powerful magnet which lifts and separates paper strips having a magnetic attraction. Accordingly, given a sheet with xerographic or laser print on it in a strong magnetic field then same will move towards a magnet and such procedure could be used as a means of preselecting xerographic or laser printed paper from office waste in the situation where there is a mixture of conventional waste material from xerographic and laser printed waste material.

In such aspect of the invention, any suitable magnet may be utilized although same should be sufficiently strong in order to separate the paper containing ink with a magnetic component from paper containing ink but without such magnetic component. Suitable magnets would be an electromagnet, a permanent magnet or a superconducting magnet.

In another procedure in accordance with such aspect, a mixture of paper waste products would be allowed to fall past at least one operating magnet and the paper waste containing ink with a magnetic component would be magnetically drawn to one side and collected. In another embodiment paper can be moved along a conveyor passing underneath a magnet. Any suitable procedure can be adopted in this regard. The operating magnet(s) should apply a magnetic force over a large area of the body of paper being treated.

In another aspect of the invention related to the processing of paper which has been printed with L or X inks to remove this ink. After separating laser (hereinafter abbreviated "L") and xerographic (hereinafter abbreviated "X") printed paper from other paper by the above method or any other method, such as manual separation or separation using magnetometer, x-ray fluorescence or optical scanning, the L and X paper is pulped. The paper is pulped in a slurry. The paper pulp formed such that the paper pulp particles are preferably less than 12 mm in length or diameter, and the amount of pulp in the slurry is 4% by weight or less. Preferably, the slurry has a concentration of 2% by weight pulp or less. In the most preferred embodiment, the concentration of the slurry is 1% or less. Preferably, water is used to make the slurry. Other liquids such as alcohol can be used to make the slurry. If desired the slurry can contain additives such as surfactants.

Thereafter, the pulp is passed by a magnetic force having sufficient force to pull the magnetizable particles from the slurry. The necessary force will vary with particular inks and slurry concentration. Preferably, the slurry is passed by a number of magnetic fields to achieve optimum results. A magnetic force of $1 \times 10^6$ Gauss$^2$/cm may be used. Preferably the applied magnetic field is 2,000 Gauss or greater and the field gradient is 500 Gauss/cm or greater.

The method can also be practiced utilizing a recycle loop to achieve multiple passes by the magnet.

In another aspect the invention relates to a method which provides for pulping a mixture of paper having both magnetizable and non-magnetizable inks. The mixed ink pulped paper is subjected to magnetic separation to remove the magnetizable inks. Preferably this is done with an aqueous slurry containing no chemical additives. Thereafter, the treated pulp is subsequently subjected to float separation of the non-magnetizable inks by conventional methods.

BRIEF DESCRIPTION OF THE DRAWINGS

The present invention will be better understood by reference to the following detailed description taken in conjunction with the drawings in which:

FIG. 3 is a graph showing the magnetic characteristics of ink from a Panasonic Laser Printed photocopier.

FIG. 4 is an illustrative chart of the type of particles typically encountered in a recycled paper pulp.

DETAILED DESCRIPTION

The invention is described in its preferred embodiments. The removal of L and X inks from recycled paper present unique problems. These types of ink includes polymeric resins which are fused to the paper during printing. Thus, unlike liquid inks which rely on absorption, the L and X inks are fused with the paper fiber, white pigments and fillers of the paper. The result is that a large amount of such material cannot be separated from the components of the paper to which it is fused and those components in the paper will come out with the ink.

In magnetic separation from a slurry, the coarser the magnetic particle generally the easier it is to separate. In wet magnetic separation the force which generally compete with the magnetic force in fluid drag. (Gravitational forces are comparatively small). A magnetic particle experiences a net resultant force: (Fr) given by Fr=Fm−Fd where Fm=Magnetic force, Fd=Fluid drag force. These are vector qualities. A non magnetic particle experiences fluid drag only hence it is possible to get a separation. The equation for fluid drag on a spherical particle in a moving liquid is:

$$Fd = 3\pi \zeta v d$$

Fd=Fluid drag $\zeta$=Fluid viscosity v=Fluid velocity relative to the particle d=particle diameter. Consequently viscosity plays a very important role. For spherical particles the magnetic attractive force is proportional to the cube of the diameter ($d^3$) whereas drag through the slurry is proportional to the diameter (d). Thus, large particles have a greater attractive force in relation to the drag produced when they are pulled through the slurry. This relationship applies to a material which is substantially all magnetic. It must be remembered that in these inks only a small fraction of the ink is magnetizable.

Nevertheless, the relationship must be kept in mind in the removal of L and X inks. It is necessary to overcome gravity and fluid drag forces (viscosity of the slurry) when utilizing the magnetic separation system in accordance with the present invention. The relationship of magnetic force to drag also means that more magnetic force is needed as the particle size is reduced.

Figure 1:
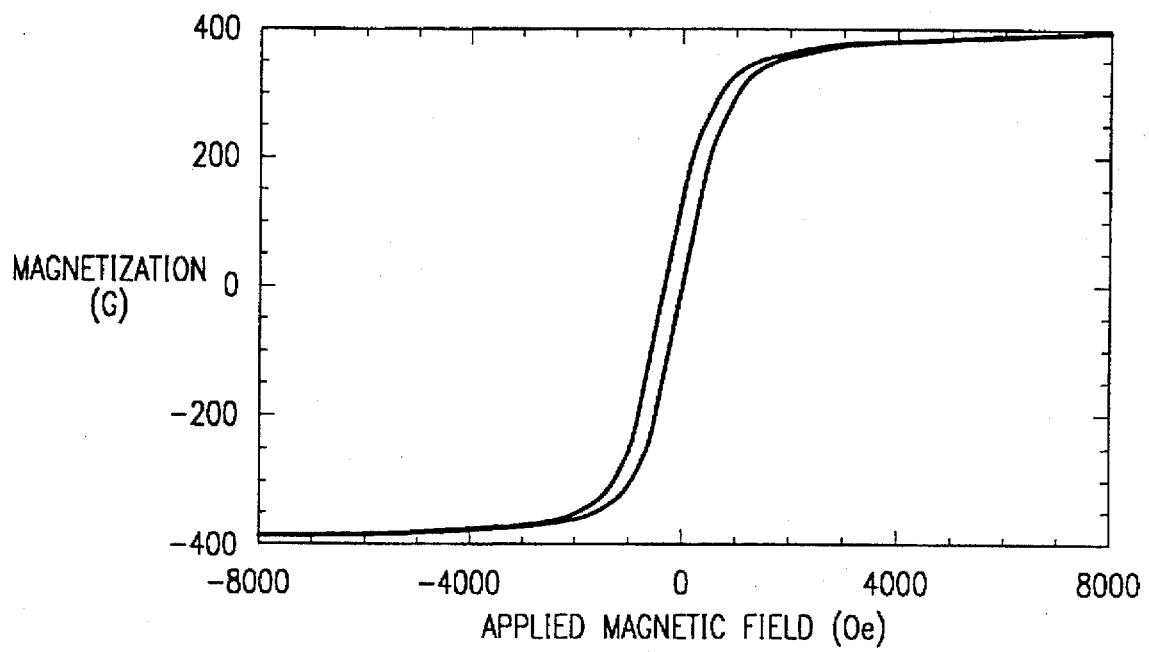
FIG. 1 is a graph showing the magnetic characteristics of ink from a Canon photocopier.
Figure 2:
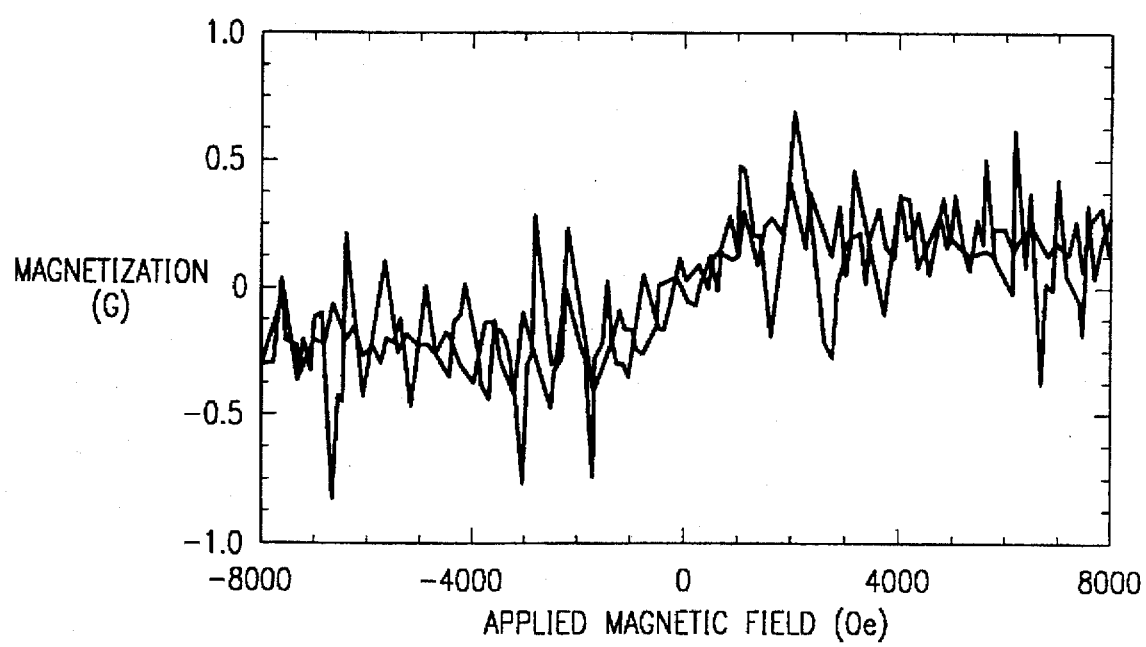
FIG. 2 is a graph showing the magnetic characteristics of ink from a Sharp photocopier.

After dry paper with L and X inks has been separated from other paper and comminuted to small sizes and pulped, it is then useful to test a sample of the paper to know what the magnetic nature of the mix is. Not all L and X inks have the same magnetic properties. FIGS. 1, 2 and 3 show a test result demonstrating the differences in magnetic properties. In FIGS. 1, 2 and 3 the graph shows the magnetization that can be induced in the ink. The X axis is the applied magnetic field in Oersteds, and the Y axis is the degree of induced magnetization in the ink in Gauss. FIG. 1 demonstrates that photocopier ink from a Canon photocopier is magnetizable. FIG. 2 demonstrates that the tested Sharp photocopier ink has virtually no or very poor magnetizable properties. FIG. 3 shows that ink from a Panasonic laser printer has intermediate magnetizable characteristics compared to the Canon and Sharp photocopier ink. These charts demonstrate that different levels of magnetic force will be necessary depending on the type of ink, or the particular mix of different types of ink in the batch of recycled paper. The graphs also demonstrate inks can be formulated to be more easily removable by magnetic techniques.

The typical type of particles one expects to find in a pulped slurry of recycled L and X paper are illustrated in FIG. 4. The data given in FIG. 4 is merely illustrative to be representative of typical values which will be encountered.

These particles result from the pulping process. Any conventional pulping process can be used to pulp the L and X printed paper. Typical pulpers in use today produce a pulp slurry with a concentration of 30% to 50% pulp, some older machines pulp at concentrations around 5%. In practice of the invention, the slurry from the pulper will usually be diluted. Although the invention will remove some of the large particles when the slurry is 4% by weight pulp, it is preferred the concentration be 2% or less. The most preferred concentration of the slurry is from 1% or less. A very dilute slurry 1% or less by weight pulp is useful in removing small particles. The very dilute solution allows the wood fiber particles to open up thereby being less likely to trap or impede travel of small ink particles through the slurry to the magnet.

In order to remove particles with ink on them they must be able to work past the entangling fibrous paper pulp and the mineral particles. Thus, a dilute slurry is needed to provide pathways for the removal having minimum drag effects.

The separation process can be performed in stages. In one embodiment, in the first stage separation is done by passing a magnetic force to remove larger magnetic particles. Thereafter, the remaining slurry can be diluted to reduce the solid by about 25% or greater than the initial concentration. This further diluted solution is passed by a magnetic force. The further dilution serves to minimize the blockage of flow of the smaller magnetic particles by the paper fiber and minerals from the paper in solution. If desired, additional passes by the magnet may be performed and further dilutions performed.

To produce ESFHB paper, components 4 and 5 in FIG. 4 must be almost completely eliminated and a majority of component 3 must be eliminated. Removal of each type can require a different level of magnetic force and/or dilution. In some instances, it will be possible to use one pass of the slurry past a suitable magnetic force. In other cases, additional passes of the slurry by the magnetic force or past an increasing magnetic force can be used. It is believed that this aspect of the present invention would be of benefit to waste paper merchants or in mills which wish to select the particular type of paper for one particular operation in the mill, for example, production of recycled paper suitable for laser or xerographic copier paper. The residual paper could then be used for production of a lower grade of recycled paper.

For purposes of this application, ink particles or agglomerates having a diameter of 50 μm (0.05 mm) or more is called a speck. The area of 50 μm diameter disk in 0.002 $mm^2$. ESFHB paper is paper which contains no or very few ink specks. The pulping process typically produced a great number of sub-speck size ink particles. However, ESFHB can be very dull in color if a number of sub-speck size ink particles are contained in the paper. The other important parameter in producing a high quality paper is brightness. Brightness can be measured by Elrepho brightest tester or similar device. The present invention also separates sufficient sub-speck size ink particles to produce ESFHB with a brightness of greater than 80% of the brightest of the original pulp used to make the paper. It was surprising that such a removal of ink and recapture of so much of the original brightness of the pulp could be recovered.

In forming the slurry for separation the recycled paper may be pulped using conventional equipment. The slurry may be made of water and the pulped recycled paper. Additives, such as surfactants, may be added but are not necessary. Thus, one advantage of the present invention is that no additives are needed to an aqueous slurry, which from cost and compliance with environmental regulations is a great advantage. The present invention also always uses other mediums than water for the slurry such as alcohol.

Magnetic force which can be provided by the separator in a function of the: fluid intensity: magnetic field intensity and the field gradient supplied by the magnets in the separator.

Tests in connection with laser and xerographic printed papers have ascertained that same are removable by a magnetic field. The magnetic force needed depends on the type of print, the slurry concentration and the particle size distribution of ink particles in the slurry. A magnetic force in excess of $1 \times 10^6$ $Gauss^2/cm$ is useful. This force can be achieved using an applied magnetic field of 2,000 Gauss and a field gradient in excess of 500 Gauss/cm. The product of these is $10^6$ $T^2/m$. Obviously, the applied magnetic field and field gradient can be varied. Suitable magnetic forces for many applications are achieved by utilizing background magnetic fields in excess of 4000 Gauss and a field gradient in excess of 1000 Gauss/cm. Magnetizable inks containing ferri or ferro magnetic material will reach a point where the induced magnetic field reaches a maximum or becomes saturated. Thereafter, increasing the applied field is not useful, so the field gradient should be increased to increase the magnetic force exerted in the ink.

However, such high and absolute fields are not necessary to practice the invention. A high gradient magnetic separation device can be envisaged which will not require such high input field strengths. It is the magnetic field gradient that is important to effect the separation. There are several types of high gradient machine designs. These devices have been called "induced pole" devices.

The field gradient is a measure of potential to pull items towards the source of the magnetic force. Because it will be unknown what type of printer ink was used on the recycled paper or the relative rates of different types of ink a test can be made a sample of the pulp by applying different amounts of magnetic force to a beaker containing a sample slurry. This procedure can also allow selection of an appropriate slurry concentration.

Devices useful in larger scale operations are high gradient magnetic separators which include:

Wet drum magnetic separator

Frantz Ferrofilter

Carpco Separator

Jones Separator

Kolm-Marston separator

However, the Frantz Ferrofilter and the Kolm-Marston separation must be modified by the removal of the fine steel wool which would be readily plugged by the fibrous paper pulp. The interior may be filled with ferro magnetic rods 3 mm in diameter or larger. Alternatively, ferro-magnetic balls may be used. These permit flow of the slurry through the separator without undue snagging of the fibrous pulp.

Further tests were carried out in connection with suspending the ink utilized in xerographic and laser printed papers in water using a surfactant due to the fact that the ink is hydrophobic. We have been able to recover such ink using a magnet. This is most beneficially employed after initial magnetic separation. The remaining very small particles of ink in the slurry can be separated.

According to a further aspect of the present invention there is provided a method of removing magnetic ink from pulp stock formed from xerographic and laser printed paper waste to provide high brightness paper of quality suitable for writing paper, comprising feeding such pulped paper waste past at least one magnet for removal of all or substantially all of such magnetic ink.

The arrangement of the at least one magnet will be so designed in order to exert a magnetic force comprising a background magnetic field of preferably 2000 Gauss or more and a field gradient preferably of 500 Gauss/cm or more.

Preferably, a plurality of magnets are utilized and the pulp stock is fed along an elongate channel-type container housing. We have also discovered that by application of a very strong magnet to the outside of the wall of a beaker containing pulp, then it is possible to drag the magnetic particles to the inside of the wall of the beaker. The magnetic force is presented to the pulp in such a way that it will allow small magnetic particles to be captured or deflected. The magnet can be placed in the channel or along the outside. The magnetic surface will be cleaned of the ink particles by stopping flow of the pulp slurry and flushing without magnetic energy applied thus releasing the captured ink.

We have discovered that incredibly fine particle magnetic separation can be obtained by presenting the appropriate magnetic force to virtually every magnetic particle. The magnetic force applied must be sufficiently high and strong to overcome the fluid drag as the pulp is fed past the magnet.

Thus, in order to recover magnetic material from the pulp, it is possible to utilize a capture-type system wherein the magnets are dropped or dipped into the pulp or are located adjacently above the pulp. Alternatively, it is possible to utilize a deflection-type system wherein the magnets are located adjacent the outer walls of the channel-shaped housing and a sufficiently large magnetic force is applied to drag the magnetic particles to the inner walls of the channel-shaped housing.

It is also possible to utilize a plurality of steel balls of selected size and shape, which balls are magnetized and thereafter introduced into the pulp. Magnetic particles and the like will become attached to the steel balls which may then be recovered from the pulp and de-magnetized, whereupon the metallic particles will become detached therefrom. The steel balls can thereafter be magnetized again and the above described process be carried out again.

The present invention also includes a process which combines features of the invention and prior techniques. A pulp is formed from paper having laser, xerographic and typical absorbed or chemical inks. The pulp slurry is reduced to a solid content below 4% by weight, and most preferably 1% or less. The slurry is subjected to magnetic force to remove the magnetizable ink. Preferably the slurry is an aqueous solution which has no additives deleterious to fillers, binders, and ash in the pulped paper. In this manner, these very valuable components can be removed from the slurry by known techniques. Thereafter, the remaining pulp with absorbed ink present can have appropriate chemicals added which are needed for chemical separation of the non-magnetic inks by conventional techniques such as froth flotation. This is a substantial improvement over use of chemical separation techniques initially because the additives incorporated into such techniques contaminate or render the none fiber portions such as ash, fillers, etc. of the paper unsuitable for reuse. Thus, the method of the present invention has significant advantages.

By utilizing the procedures outlined above, separation of magnetic material for the pulp may be achieved. However the binders, fillers and white pigments contained in the pulp are not separated and therefore can be reused in producing recycled paper.

It is necessary to overcome gravity and fluid drag forces (intensity of pulp) when utilizing the magnetic separation system in accordance with the present invention. Savings can be achieved in that previously utilized separation procedures in procedures for recycling paper which involve costly materials, e.g. china clay, can be avoided.

In a further aspect of the present invention, a method is provided for improving the recyclability of paper waste having ink thereon which does not normally contain a magnetic component, by utilizing one or more magnetic carriers in the formulations of the printing ink utilized, to enable same to be removed by use of at least one magnet in accordance with the procedures outlined above.

In this aspect of the invention, where carbon black is the primary pigment, it is possible to incorporate in such ink metallic iron or its oxides or some other paramagnetic material in order to make the ink magnetic. Such process would facilitate the removal of other types of inks such as flexographic inks were the carrier matrix is an alkali soluble polymer (polyacrylate).

In a still further aspect of the present invention there is provided a method of enabling adhesive material to be removed from paper pulp containing same, by incorporating a magnetic filler or carder in said adhesive and removing such adhesive by magnetic means. Thus, adhesive can be removed from the water phase after pulping of paper containing adhesive used in the book binding field.

It will thus be seen that the present invention contemplates the use of a magnet of suitable strength to enable a particular type of printed paper to be separated from other types of paper and for ink contained on such paper to be removed during the pulping process, both processes utilizing a magnet such as an electromagnet, a permanent magnet or a superconducting magnet. It is also envisaged within the present invention to incorporate one or more magnetic carders or fillers into other types of inks and adhesive or materials utilized in the paper manufacturing industry, so as to enable such inks and other types of materials to be removed from the paper pulp when recycling is taking place, again by magnetic means.

The use of a magnet would be economic as compared to known processes and would be ecologically friendly in that no chemicals are being utilized. In view of the believed advantages obtained utilizing such magnetic techniques, the amount of virgin pulp which would be required could be substantially reduced. As indicated above, any suitable magnet can be utilized provided same has sufficient field strength and intensity of field force.

I claim:

1. A method of separating laser and xerographic ink from paper pulped comprising; forming a pulp slurry having a pulp concentration of 4% or less by weight containing paper which has been printed with an ink containing a magnetizable ink; passing the slurry by a magnetic force sufficient to pull magnetizable particles out of the slurry; and wherein the magnetic force utilized is a magnetic field in excess of 2,000 Gauss or more and a field gradient of 500 Gauss/em or more.

2. A method as claimed in claim 1, in which at least one electro-magnet and/or at least one permanent magnet and/or at least one superconducting magnet is utilized.

3. A method as claimed in claim 1, in which a plurality of magnets are utilized and the pulp stock is fed along an elongate channel-type container housing, the magnetic force being presented to the pulp in such a way that it will allow small magnet particles to be captured or deflected.

4. A method as claimed in claim 1, in which recovery of magnetic material from the pulp stock is effected in a capture-type manner, wherein the or each magnet is dropped into the pulp or is located adjacently above the pulp.

5. A method as claimed in claim 1, in which the magnetic material is recovered from the pulp in a deflection-type manner, wherein the or each magnet is located adjacent the outer wall of the channel-shaped housing.

6. A method as claimed in any one of claim 1, wherein the magnetic force includes a magnetic field of at least 4000 Gauss and a field gradient of at least 1000 Gauss/cm.

7. The process of 1 wherein the pulp concentration is 0.75% by weight or less.

8. The method of claim 1, wherein the recovery of magnetic material from the pulp stock is effected by flowing the pulp through a separator having an array of magnetic rods therein having a diameter of 3 mm or greater.

9. The process of claim 1 further comprising the steps of diluting the slurry which results after said pulp slurry has passed by said magnetic field, and then passing the diluted slurry by a magnetic force having a field of 2000 Gauss or more and a field gradient of 500 Gauss or more.

10. A method of removing ink with a magnetizable component comprising:
  (a) forming a slurry of pulped paper which had been printed by magnetizable ink having a concentration of 1% or less of pulp by weight;
  (b) subjecting the slurry to a magnetic force of $1 \times 10^6$ Gauss 2/cm or more to pull the magnetizable ink towards the magnetic force;
  (c) removing the slurry from the magnetic force so that magnetizable ink particles in the slurry are separated from the pulp slurry.

11. The method of claim 10 comprising the step of subsequently subjecting the slurry to conventional techniques to separate non-magnetizable ink.

12. The process of claim 10 further comprising the steps of:
  (d) taking the slurry from step c;
  (e) diluting the slurry from step c, by 25% or more;
  (f) subjecting the resulting slurry from step e to a magnetic field of at least 4000 Gauss and a field gradient of at least 1000 Gauss/cm to pull the magnetizable ink towards the magnetic force.

13. The method of claim 12, wherein the recovery of magnetic material from the pulp stock is effected by flowing the pulp through a separator having an array of magnetic rods therein having a diameter of 3 mm or greater.

14. The method of claim 12 wherein the recovery of magnetic material from the pulp is effected by flowing the pulp through a wet drum magnetic separator.

15. A method of separating laser and xerographic ink from paper consisting essentially of:
  (a) pulping paper which has been printed with laser or xerographic ink in water to form a slurry having a pulp concentration of 4% or less by weight; and
  (b) passing the slurry by a magnetic force having a magnetic field of at least 4000 Gauss and a field gradient of at least 1000 Gauss/era to remove magnetizable particles.

16. The method of claim 15, wherein the recovery of magnetic material from the pulp stock is effected by flowing the pulp through a separator having few magnetic rods therein having a diameter of 3 mm or greater.

17. The process of claim 15 wherein said pulp concentration is 0.75% by weight or less.

* * * * *